United States Patent [19]
Fujinoki et al.

[11] Patent Number: 6,094,941
[45] Date of Patent: Aug. 1, 2000

[54] PROCESS FOR MANUFACTURING OPTICAL MEMBER FOR EXCIMER LASER

[75] Inventors: Akira Fujinoki; Toshikatsu Matsuya; Hiroyuki Nishimura, all of Koriyama, Japan

[73] Assignee: Shin-Etsu Quartz Products Co., Ltd., Tokyo, Japan

[21] Appl. No.: 09/115,741

[22] Filed: Jul. 15, 1998

Related U.S. Application Data

[63] Continuation-in-part of application No. 08/466,909, Jun. 6, 1995, abandoned.

[51] Int. Cl.[7] .......................... C03C 15/00; C03B 37/00; C03B 27/012; C03B 37/018; C03B 37/01
[52] U.S. Cl. .................. 65/30.1; 65/32.1; 65/33.2; 65/392; 65/424; 65/425; 65/441
[58] Field of Search .................. 65/30.1, 32.1, 65/33.2, 111, 157, 392, 424, 425, 441, DIG. 8

[56] References Cited

U.S. PATENT DOCUMENTS

| | | | |
|---|---|---|---|
| 5,086,352 | 2/1992 | Yamagata et al. | 359/350 |
| 5,500,031 | 3/1996 | Atkins et al. | 65/386 |
| 5,616,159 | 4/1997 | Araujo et al. | 65/17.4 |

OTHER PUBLICATIONS

R.W. Lee: Role of Hydroxyl in Diffusion of Hydrogen in Fused Silica, pp. 36–43.
Physical Sciences Data 15, Handbook of Glass Data, Part A, "Silica Glass And Binary Silicate Glasses", O.V. Mazurin et al. pp. 158–161.

*Primary Examiner*—Stanley S. Silverman
*Assistant Examiner*—Jacqueline A. Ruller
*Attorney, Agent, or Firm*—Evenson, McKeown, Edwards & Lenahan, P.L.L.C.

[57] ABSTRACT

An excellent quartz glass optical member having stable laser beam resistance, can be obtained by preparing quartz glass in a process having:

a first step of subjecting a starting material obtained from silicon halide, alkoxysilane, alkylalkoxysilane, etc. to an oxidizing heat treatment in a temperature range between 600 and 1,500° C., to decrease the hydrogen concentration to $5 \times 10^{16}$ molecules/cm$^3$ or less and at the same time eliminate reducing defects;

a second step of subsequently holding the quartz in a hydrogen-containing atmosphere in a temperature range between 200 and 600° C., to establish a hydrogen concentration in the glass of $1 \times 10^{17}$ molecules/cm$^3$; and a third step of carrying out a treatment of making the hydrogen concentration of the resultant quartz glass uniform in an atmosphere of air, inert gas, hydrogen, a mixture of hydrogen and inert gas, or a mixture of air and inert gas in a temperature range between 300 and 800° C.

25 Claims, 10 Drawing Sheets

F I G. 1

| SAMPLE No. | REDUCING DEFECT REMOVAL PROCESS | HYDROGEN CONCENTRATION (MOLECULES/cm$^3$) | DOPING TEMPERATURE (°C) | DOPING PRESSURE (Pa) | DOPING TIME (Hr.) | LASER EVA. INITIAL →LONG TERM (200 mJ/cm$^2$p) | LASER EVA. INITIAL →LONG TERM (20 mJ/cm$^2$p) |
|---|---|---|---|---|---|---|---|
| A-1 | ○ | $<1\times10^{16}$ | — | — | — | △→× | — |
| A-2 | ○ | $5.5\times10^{19}$ | 300 | 100 | 720 | ◎→○ | — |
| A-3 | ○ | $5.1\times10^{19}$ | 400 | 100 | 120 | ◎→○ | — |
| A-4 | ○ | $5.0\times10^{19}$ | 600 | 100 | 48 | ○→○ | ◎→◎ |
| A-5 | ○ | $5.2\times10^{19}$ | 800 | 100 | 24 | △→△ | △→○ |
| A-6 | ○ | $2.1\times10^{17}$ | 300 | 1 | 720 | ◎→× | ◎→○ |
| A-7 | ○ | $1.2\times10^{18}$ | 300 | 10 | 720 | ◎→× | ◎→△ |
| A-8 | ○ | $3.2\times10^{19}$ | 300 | 50 | 720 | ◎→△ | ○→○ |
| A-9 | ○ | $8.9\times10^{19}$ | 300 | 200 | 720 | ◎→◎ | ◎→◎ |
| B-1 | × | $1.0\times10^{18}$ | — | — | — | ×→△ | — |
| B-2 | × | $5.4\times10^{19}$ | 300 | 100 | 720 | ×→○ | ×→◎ |

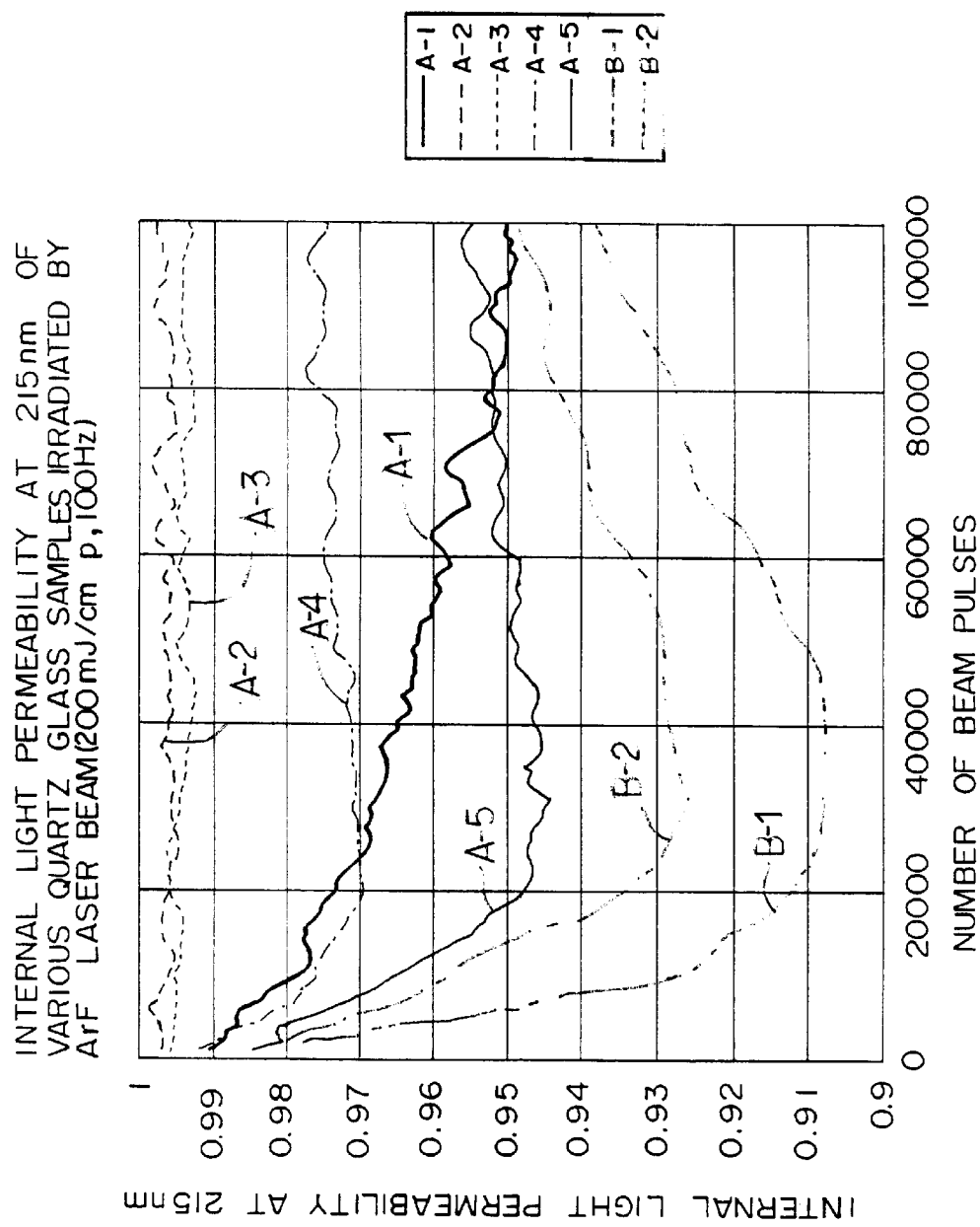

F I G. 3

| SAMPLE No. | HYDROGEN-DOPING PRESSURE (Pa) | HYDROGEN CONCENTRATION (MOLECULES/cm$^3$) | REDUCING DEFECT REMOVAL PROCESS | INTERNAL LIGHT PERMEABILITY CHANGE (T %) WITH ArF LASER (300 mJ/cm$^2$p) PULSE BEAM IRRADIATION |
|---|---|---|---|---|
| A-6 | 1 | $2.1 \times 10^{17}$ | | 20.5 |
| A-7 | 10 | $1.2 \times 10^{18}$ | ◯ | 9.8 |
| A-8 | 50 | $2.1 \times 10^{19}$ | ◯ | 5.1 |
| A-2 | 100 | $5.5 \times 10^{19}$ | ◯ | 3.8 |
| A-9 | 200 | $8.9 \times 10^{19}$ | ◯ | 2.9 |

Fig. 8

| Sample No. | heat treatment time(hours) | Hydrogen concentration in a portion 20mm from the periphery (molecules/cm$^3$) | Hydrogen concentration in a central portion (molecules/cm$^3$) | $\Delta n$ |
|---|---|---|---|---|
| C-1 | 50 | $1.5 \times 10^{19}$ | $5.8 \times 10^{18}$ | $9 \times 10^{-6}$ |
| C-2 | 100 | $1.2 \times 10^{19}$ | $5.2 \times 10^{18}$ | $4 \times 10^{-6}$ |
| C-3 | 200 | $9.0 \times 10^{18}$ | $4.8 \times 10^{18}$ | $3 \times 10^{-6}$ |
| C-4 | 300 | $7.0 \times 10^{18}$ | $3.9 \times 10^{18}$ | $2 \times 10^{-6}$ |
| C-5 | 400 | $5.1 \times 10^{18}$ | $3.2 \times 10^{18}$ | $2 \times 10^{-6}$ |

Fig. 9

| Sample No. | Heat treatment time (hours) | Hydrogen concentration in a portion 20mm from the priphery (molecules/cm$^3$) | Hydrogen concentration in a central portion (molecules/cm$^3$) | $\Delta n$ |
|---|---|---|---|---|
| C-6 | 30 | $1.4 \times 10^{19}$ | $5.8 \times 10^{18}$ | $9 \times 10^{-6}$ |
| C-7 | 60 | $1.2 \times 10^{19}$ | $5.1 \times 10^{18}$ | $4 \times 10^{-6}$ |
| C-8 | 120 | $8.8 \times 10^{19}$ | $4.9 \times 10^{18}$ | $3 \times 10^{-6}$ |
| C-9 | 180 | $6.9 \times 10^{18}$ | $3.7 \times 10^{18}$ | $2 \times 10^{-6}$ |
| C-10 | 240 | $4.9 \times 10^{18}$ | $3.0 \times 10^{18}$ | $2 \times 10^{-6}$ |

PROCESS FOR MANUFACTURING OPTICAL MEMBER FOR EXCIMER LASER

CROSS REFERENCE TO RELATED APPLICATIONS

This application is a continuation-in-part of application Ser. No. 08/466,909, filed Jun. 6, 1995, now abandoned.

BACKGROUND OF THE INVENTION

1. Field of the Invention

This invention relates to a process for manufacturing quartz glass optical members with excellent stability to irradiation of excimer lasers, particularly, ultraviolet excimer lasers of KrF, ArF etc. More specifically, the invention concerns a process for manufacturing quartz glass optical members suitable for lenses, mirrors and prisms as such which constitute optical systems of laser processing apparatus or lithographic apparatus using the excimer lasers mentioned above as a source of light.

2. Description of the Prior Art

With the recent trend of increased density in large scale integrated circuits (LSI), a technique of drawing finer patterns with finer lines has been required in the photolithographic technique of drawing integrated circuit patterns on wafers. To meet this demand, attempts have been made to shorten the wavelength of the exposure light source. For example, the lithographic stepper light source is in a stage of transition from conventional G rays (436 nm) or I rays (365 nm) to excimer laser of KrF (248 nm) or excimer laser of ArF (193 nm). Lenses used for steppers are required to be very homogenous and permeable to ultraviolet rays.

In a shorter wavelength range than I rays (365 nm) mentioned above, sufficient light permeability can not be obtained with conventional multicomponent optical glasses. For this reason, it has been the practice to use quartz glass, particularly synthetic quartz glass (i.e., synthetic silica glass) with less impurity content in order to reduce ultraviolet ray absorption as much as possible.

To avoid contamination with metallic impurities which bring about ultraviolet ray absorption, the synthetic quartz glass is usually prepared from pure volatile silicon compounds synthesized chemically and purified by distillation. Such silicon compounds are silicon halides e.g. silicon tetrachloride ($SiCl_4$) or alkoxy silanes e.g. tetraethoxy slane ($Si(OC_2H_5)_4$) and tetramethoxy silane (($SiOCH_3)_4$) or alkylakoxy silanes e.g. methyltrimethoxy silane (($SiCH_3(OCH_3)_3$) or siloxanes e.g. hexamethyldisiloxane. In the preparation of the synthetic quartz glass, the vapor of a given compound such as those mentioned above is directly introduced into an oxyhydrogen flame for flame hydrolysis therein. As a result, fine glass particles are produced. These glass particles are grown by fusion deposition directly on a rotating heat-resistant core rod, thus obtaining transparent pure quartz glass.

In another process of obtaining quartz glass, the fine glass particles are not directly fusion deposited, but they are deposited on a heat-resistant core rod to form porous silica material, which is then made transparent by heating it in an electric furnace.

The synthetic quartz glass manufactured in the above ways is highly pure and results in good permeability down to a short wave length range of about 190 nm. Thus, it is frequently used as material for ultraviolet lasers, particularly as a light-permeable material for ecximer lasers of KrF or ArF.

However, although the method of improving the light permeability of ultraviolet lasers by improving the purity of the synthetic quartz glass is effective to a certain extent, sometimes the durability may be insufficient when exposed to long time irradiation of the excimer laser of KrF, ArF or the like. The reason is that the excimer laser beam is a pulse beam having a pulse duration of about 20 nsec (nanoseconds), that is, its energy per unit time is very high compared to ultraviolet rays emitted from the usual mercury lamp or others, and a very high load is applied to the glass.

To preclude the above drawback, the applicant has proposed a technique of increasing the ultraviolet laser beam resistance by doping the synthetic quartz glass with hydrogen, as disclosed in Japanese Patent Application No. 145226/1989 (U.S. Pat. No. 5,086,352). This technique is very effective. Actually, synthetic quartz glass containing $1\times10^{17}$ molecules/$cm^3$ or more of hydrogen meets requirements of a material for a KrF lithographic optical member. The technique thus has been carried out as industrially effective means as well.

The technique of hydrogen doping by heating the synthetic quartz glass in a normal pressure or pressurized hydrogen gas atmosphere is disclosed in the above application.

Such a hydrogen-doping technique is also disclosed in Japanese Patent Laid-Open Publication No. 201664/1989. Particularly this publication shows a technique to permit the doping with hydrogen by heat treatment in a hydrogen gas atmosphere at standard pressure at 800 to 1,000° C.

The technique shown in the application was based upon the standpoint of hydrogen concentration and OH group concentration. However, as a result of extensive study conducted by the inventor on the behavior of paramagnetic defects that are generated by laser beam irradiation, the inventor found that paramagnetic defects are not always suppressed in the entire quartz glass so long as hydrogen is contained in a predetermined concentration, but there is a scatter of laser beam resistance depending on the state of the material. This scattered distribution of laser beam resistance directly leads to a scattered distribution of the service lives of the optical members. Therefore, this phenomenon constitutes a fatal disadvantage for industrial use of this kind.

Further, the paramagnetic defects generated by laser beam irradiation have an absorption peak at 215 nm. Therefore, although the problem is not so significant with the KrF laser (248 nm) which is spaced away from the absorption peak of the paramagnetic defects, it is a serious problem in the case of the ArF laser (193 nm) which is close to that absorption peak.

In the meantime, the excimer laser beam of ArF or KrF has very high energy and can directly break chemical bonds. Thus, a process for stripping cable wires or a process for piercing holes through a metallic or polyimide resin panel can be done more quickly without generating excessive heat using an excimer laser in comparison with a conventional YAG laser or a carbon dioxide gas laser. Since no excessive heat is evolved, it is possible to ensure accurate processing. Excimer lasers thus will be a promising field in industry.

However, the material applied to such optical systems is limited to synthetic quartz glass in order to be satisfactorily permeable to ultraviolet radiation. Even if the material is synthetic quartz glass, it is subject to optical damage because of the high energy of the irradiated light. Thus the problem of durability occurs frequently up to now.

In particular, the excmier laser beam energy that is required for laser abrasion processing is extremely intense since the necessary energy should be sufficient to decompose and vaporize polyimide or metals in the abrasion process. Optical members like those used in excimer laser lithography can not be applied in this technical field to obtain sufficient effects although they may be durable as laser lithographic lens material.

SUMMARY OF THE INVENTION

The object of the present invention is to provide a process for manufacturing optical members which are more stable and durable to excimer laser radiation particularly ArF or KrF excimer laser radiation in view of the above drawbacks inherent in the prior art, suppressing generation of scattered paramagnetic defects at the time of laser beam irradiation.

Another object of the invention is to provide a process for manufacturing optical members which are suitable for excimer laser abrasion processing machines, particularly optical members which can ensure sufficient optical stability for long time.

A further object of the invention is to provide a process for manufacturing optical members which are suitably applicable to lithographic machines.

The inventors conducted extensive research to solve the above problems and found that with ultraviolet laser resistant synthetic quartz glass prepared from a transparent glass starting material, obtained by fusion depositing fine glass particles, the effect of laser resistance improvement by doping with hydrogen is not determined solely by the hydrogen concentration, but is dependent on the state of the quartz glass at the time of doping with hydrogen and also on the temperature of doping with hydrogen. It was also found that the objects of the invention can be attained by appropriately adjusting the state of quartz glass before doping with hydrogen and also the temperature thereof in addition to the adjustment of the optimum hydrogen concentration and further by making the introduced hydrogen concentration distribution uniform.

Since the synthetic quartz obtained by directly fusion depositing fine silica particles on a core rod is synthesized in an oxyhydrogen flame, the resulting synthetic quartz contains dissolved hydrogen in a considerable concentration. The hydrogen concentration in this case may be as high as $1 \times 10^{18}$ molecules/cm$^3$ or above.

Because of the very high temperature when introducing hydrogen into quartz glass, it turned out that hydrogen generates reduction defects in the synthetic quartz at the time of preparation.

Therefore, although such quartz glass has a high hydrogen concentration, when it is irradiated with excimer laser, defects called E* centers with an absorption peak at 215 nm are generated quickly, thus abruptly reducing the permeability of the laser.

A first feature of the present invention is that a starting material which is obtained from such compounds as silicon halide, alkoxy silane and alkylalkoxy silane, etc. is subjected to an oxidizing heat treatment at the temperature from 600° C. to 1,500° C. to reduce the hydrogen concentration to $5 \times 10^{16}$ molecules/cm$^3$ or less and to decrease the reduction defects at the same time.

The reduction defects are generally of the oxygen deficiency type. They have an absorption peak at 245 nm. It was thus found that the reduction defects could be precluded so long as the internal light permeability at this wavelength is 99% or above per 1 cm of sample.

The term "internal light permeability" means a value equal to the apparent light permeability per 1 cm of sample thickness divided by the theoretical light permeability.

Under temperature conditions suitable for the removal of the reduction defects described above, quartz glass strain can be removed at the same time, and it is efficient to carry out these two steps simultaneously.

In a preferred embodiment of the present invention, the first feature of the invention comprises a first step of removing the reduction defects, particularly those of the oxygen deficiency type, by heating the starting material in an oxygen-containing atmosphere in a temperature range of 800° C. to 1,500° C., preferably 1,000° C. to 1,300° C., and then gradually cooling the material to obtain an internal light permeability of 99.8% or above to ultraviolet rays having a wavelength of 245 nm and reducing the hydrogen concentration to $5 \times 10^{16}$ molecules/cm$^3$ or below as well as removing the strain.

In a second step, the hydrogen concentration is adjusted to at least $1 \times 10^{17}$ molecules/cm$^3$. It has been found by experiments that if the hydrogen is doped at high temperature in this step in order to increase the doping rate, new reduction defects are again generated.

Accordingly, the second feature of the present invention is that the quartz glass is held in a hydrogen-containing atmosphere in a temperature range between 200° C. to 600° C. to adjust the hydrogen concentration to $1 \times 10^{17}$ molecules/cm$^3$.

If the hydrogen doping temperature is above 600° C., reduction defects are generated from the reaction between quartz glass and hydrogen. If the hydrogen doping temperature is below 200° C., the diffusion rate of hydrogen gas in quartz glass is so low that the doping process does not fall within an industrially economical range.

Where the hydrogen doping is carried out at a temperature of 500° C. or below after an oxidizing treatment according to the invention, the stability to a laser beam is increased by increasing the hydrogen concentration. Thus, the higher the hydrogen pressure is at the time of the hydrogen doping, the better the stability will be. Actually it is necessary to carry out hydrogen doping at a temperature of 600° C. or below in a high pressure furnace such as an autoclave under a pressure of 10 atm or above, preferably 50 atm or above.

As a technique similar to the invention, the applicant has earlier proposed in Japanese Patent Laid-Open Publication No. 23236/1991, a technique in which an ingot having a certain OH group concentration is heat treated in an oxygen gas atmosphere and then heat treated in a hydrogen gas atmosphere at about 600° C. to 700° C. The object of this technique, however, is merely to remove defects of the oxygen deficiency type through oxidizing heat treatment. In contrast with the above prior technique, the present invention takes the reduction defects generated as a result of reaction between quartz glass and hydrogen into consideration and involves carrying out hydrogen doping to remove and preclude such defects.

The applicant has further proposed in Japanese Patent Laid-Open Publication No. 88742/12991, a technique of hydrogen doping by heating silica glass in a standard pressure or pressurized hydrogen gas atmosphere at 200° C. to 1,200° C. This technique, however, merely limits the temperature range of hydrogen doping. Compared with this earlier technique, the present invention involves the feature that after removing the reduction defects and before carrying out hydrogen doping, hydrogen is introduced in a designated temperature range at which reduction defects are not re-generated.

Specifically, the invention features the first step of removing reduction defects and hydrogen contained in synthetic quartz glass obtained by direct fusion deposition of fine silicon particles on a core rod, and the second step of carrying out hydrogen doping such that reduction defects will no longer be generated. According to the invention, the combination of these two steps is a primary prerequisite.

However, concerning the hydrogen concentration distribution of the quartz glass with a high hydrogen concentration obtained in this way, the concentration in the central part is lower than the concentration in the peripheral parts due to the principle of diffusion. This hydrogen concentration variation has a proportional effect on the refractive index distribution and adversely affects the intrinsically required uniformity. Accordingly, the present invention further features a third step that causes the hydrogen concentration introduced by the second step to be uniform.

In the third step, which is the last step according to the invention, a treatment to make the hydrogen concentration of the quartz glass obtained in the second step to be uniform, is carried out in an atmosphere of air, inert gas, hydrogen, a mixture of hydrogen and inert gas, or a mixture of air and inert gas in a temperature range of 300° C. to 800° C. for a predetermined period of time.

The objects of the invention can be attained only by carrying out the first to third steps in sequence.

In the above way, according to the invention it is possible to produce optical members made of synthetic quartz glass for ultraviolet excimer lasers, which preclude reduction defects, have a hydrogen concentration of $1 \times 10^{17}$ molecules/cm$^3$ or above, preferably $1 \times 10^{19}$ or above, and also have a uniform refractive index distribution.

The inventor has conducted extensive research and investigations in order to realize an optical member, which is sufficiently durable in its application to high output excimer lasers, particularly to excimer laser abrasive processing machines. As a result, it has been found that optical members having satisfactory durability even when used in an excimer laser abrasion processing machine could be obtained in the following manner. A synthetic quartz glass starting material having an OH group concentration of 500 ppm or above is made by directly depositing and melting fine silica particles on a rotating core rod, the fine silica particles being formed by flame hydrolysis of volatile silicone compounds, e.g., tetramethoxy silane, in an oxyhydrogen flame or flame of oxygen and hydrogen-containing combustible gas, e.g. methane. If necessary, the quartz glass is then melted by a zone melting method and given a twist while melting so as to be homogenized in at least one direction. Further the quartz glass is heated at 800° C. to 1,500° C., preferably 800° C. to 1,300° C., in an oxygen-containing atmosphere (which may be ordinary air) so that the hydrogen concentration of the quartz glass is decreased to $1 \times 10^{16}$ molecules/cm$^3$ or below. After that step, the hydrogen concentration of the quartz glass is increased to $1 \times 10^{19}$ molecules/cm$^3$ by doping the material with hydrogen in an autoclave under a high pressure of 10 atm, preferably 50 atm or above, at a temperature above 200° C. and below 600° C., preferably 300° C. to 450° C., and then the quartz glass is heated at a temperature of 300° C. to 800° C. in an atmosphere of air, inert gas, hydrogen, a mixture of hydrogen and inert gas, or a mixture of air and inert gas so as to make the hydrogen concentration of the quartz glass uniform.

Another way of obtaining a uniform starting material is to cause flame hydrolysis of volatile silicon compounds to generate fine silica particles with a single burner or a plurality of burners and directly fusion depositing these silica particles on a rotating core rod so as to grow the rod while maintaining a uniform distribution of the refractive index thereof by controlling the temperature condition and other growing conditions.

In this process, in order to preclude the adverse effects of chlorine that is contained as an impurity in the synthetic quartz glass, it is desirable to select the volatile silicon compound which serves as the starting material of the synthetic quartz glass from the group of silanes which are free from chlorine, e.g. tetraethoxy silane $Si(OC_2H_5)_4$, methyltrimethoxy silane $SiCH_3(OCH_3)_3$ or hexamethyl disiloxane $Si_2O(CH_3)_6$.

BRIEF DESCRIPTION OF THE DRAWINGS

The invention will be described in further detail hereinafter with reference to the accompanying drawings in which:

FIG. 1 is a table listing hydrogen concentration, doping temperature, doping pressure, doping time and laser evaluation result of a first group of samples;

FIG. 2 is a graph showing the change of the internal light permeability obtained with samples A-1 to A-5 in the above sample group when irradiated with an ArF laser beam, which is often used in an excimer laser abrasion processing machine;

FIG. 3 is a table listing the hydrogen concentration, doping pressure and laser evaluation result of samples A-2, A-6 to A-9, B-1 and B-2 in a second sample group;

FIGS. 8 and 9 are tables showing results corresponding to conditions of a final step in an embodiment of the invention;

DETAILED DESCRIPTION OF PREFERRED EMBODIMENTS

Now, an embodiment of the invention will be described in detail with reference to the drawings. It is to be construed that unless specifically noted, materials, shapes, relative dispositions, etc. of components described are not intended to limit the scope of the invention, but are merely exemplary.

The process of preparing synthetic quartz glass used in the present invention will first be described.

The volatile silicon compound used for the synthesis is a highly pure volatile silicon compound which is synthesized chemically and purified by distillation. It may be selected from, for instance, the group consisting of silicon halides, e.g. silicon tetrachloride ($SiCl_4$), alkoxy silanes, e.g. tetraethoxy silane ($Si(OC_2H_5)_4$) or tetramethoxy silane ($Si(OCH_3)_4$), alkylalkoxy silanes, e.g. methyltrimethoxy silane ($SiCH_3(OCH_3)_3$) and alkylsiloxanes, e.g. hexamethyldisiloxane ($Si_2O(CH_3)_6$).

The use of a Cl-containing volatile compound such as silicon tetrachloride ($SiCl_4$) is not recomended since chlorine remains as a contaminant in the synthetic quartz glass produced.

In an example, a synthetic quartz glass ingot having a diameter of 100 mm and a length of 800 mm was produced by fusion depositing, on a rotating target, fine particles of silica obtained through flame hydrolysis of, for instance, high purity methyltrimethoxy silane ($SiCH_3(OCH_3)_3$) in an oxyhydrogen flame.

At this time, the OH concentration in the ingot was 600 ppm. This was found through the absorbance at 3,800 $cm^{-1}$ as measured by an infrared spectroscopic method. Further, the hydrogen molecule concentration in the ingot, as measured by a Raman scattering spectoscopic method, was $2 \times 10^{18}$ molecules/$cm^3$. An Ar laser "MR-1000" manufactured by Nihon Bunko Kogyo, with a wavelength of 488 nm and an output of 700 mW, was used, and the measurement was made by photon counting using a photo-multiplier "R943-02" manufactured by Hamamatsu Photonics Co., Ltd.

The hydrogen concentration in the quartz glass in the present invention was measured by a method shown in Zhurmal Prikladonoi, Spektroskopii, Vol. 46, No. 6, pp. 987–991, June 1987.

That is, the hydrogen concentration was determined from the ratio of the Raman band intensity at a wavelength of 800 $cm^{-1}$ relating to $SiO_2$ and the intensity at 4135 $cm^{-1}$ relating to hydrogen molecules contained in the quartz glass. The hydrogen molecule concentration C is calculated by $$C = K(l_{4135}/l_{800}) \quad (1)$$

where K is a constant ($1.22 \times 10^{21}$), $l_{4135}$ is the Raman band area intensity at 4,135 $cm^{-1}$ and $l_{800}$ is the Raman band area intensity at 800 $cm^{-1}$.

The hydrogen molecule concentration calculated by this equation is the number of hydrogen molecules contained in 1 $cm^3$ of quartz glass.

Figure 5:
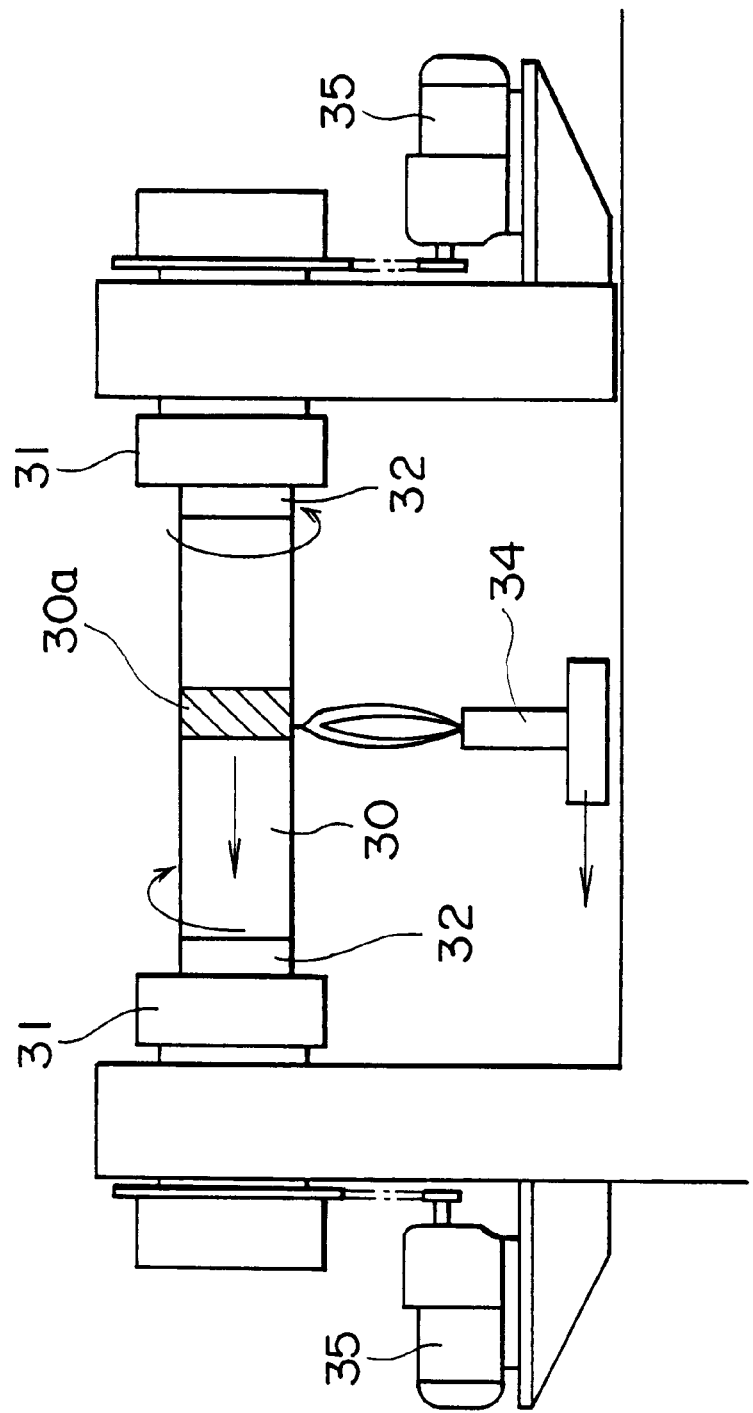
FIG. 5 is a schematic view showing a striae removal apparatus used in the process of manufucture embodying the invention.

As shown in FIG. 5, both ends of a synthetic quartz glass ingot 30 were connected to support rods 32 of quartz glass having the same diameter as the ingot. Both ends were then clamped in chucks 31 of a striae removal apparatus. Then, while alternately rotating the ingot 30 clockwise and counterclockwise by a predetermined angle, by synchronously rotating both end chucks 31, one end of the ingot is heated intensively with an oxyhydrogen burner 34, thus forming a fused region 30a. After the fused region had been formed, the one end chuck 31 was rotated in the opposite directions from the other end chuck 31, thus applying kneading forces in a circumferential direction to the quartz glass in the fused region 30a. Motors for rotating the chucks 31 are designated by 35.

In this state, the oxyhydrogen burner 34 was moved slowly toward the other end of the synthetic quartz glass ingot 30. In this way, the entire ingot 30 was homogenized.

After the homogenizing, the ingot 30 was released from the support rods 32, samples were cut out from the ingot 30, and striae of these samples were observed. Although striae were observed in a direction perpendicular to the rotational axis of the ingot 30, no stria was observed in the sectional direction of the ingot 30.

The homogenized synthetic quartz glass was cut into a plurality of samples with an outer diameter of 100 mm and a thickness of 15 mm, which were divided into sample groups A and B. The samples in group A were subjected to a reduction defects removal treatment by heating in an electric furnace at atmospheric air pressure and 1,000° C. for 48 hours, then cooling gradually down to 200° C., then leaving them to cool down to ambient temperature. The samples in group B were not subjected to the reduction defects removal treatment, but were used directly for the next step.

After cooling the samples, the hydrogen concentration was measured by the Raman scattering spectroscopic method. The measured hydrogen concentration was $1 \times 10^{16}$ molecules/$cm^3$, the value being equal to the limit of detection by the method of measurement. The internal light permeability at 245 nm was 99.9%/cm.

Figure 4:
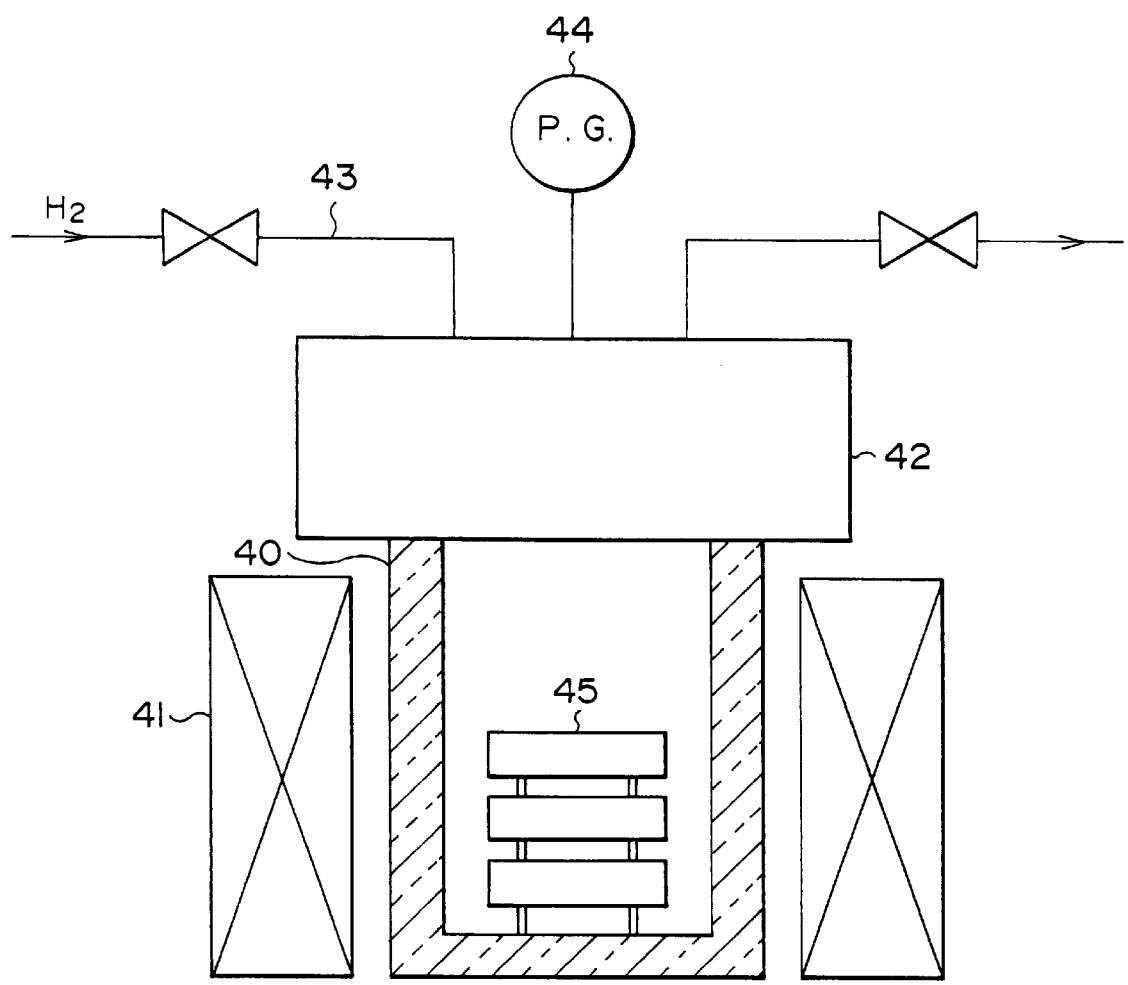
FIG. 4 is a schematic view showing an autoclave used to carry out the process of manufacture embodying the invention.

Thereafter, sample A-9 was sealed under high pressure hydrogen gas at substantially 100 atm in an autoclave shown in FIG. 4, and the furnace temperature was elevated up to 300° C. It was found that the inner gas pressure was increased to approximately 200 atm. The sample was held in this state for 720 hours. Then, the hydrogen concentration of the processed sample A-9 was measured by the Raman scattering spectroscopic method. It was found to be $8.9 \times 10^{19}$ molecules/$cm^3$.

The autoclave used, as shown in FIG. 4, has a structure comprising a furnace body 40 made of stainless steel, a heater 41 surrounding the furnace body 40, and a head 42 made of stainless steel which seals the open top of the furnace body 40. A hydrogen pipe 43 and a pressure gauge 44 are mounted on the head 42. Samples subjected to the hydrogen doping process are designated by reference numeral 45.

Sample A-2 was sealed under high pressure hydrogen gas at substantially 50 atm, and the furnace temperature was elevated up to 300° C. The inner gas pressure was found to be increased to approximately 100 atm. The sample was held in this state for 720 hours. Then, the hydrogen concentration of the processed sample A-2 was measured by the Raman scattering spectroscopic method and found to be $5.5 \times 10^{19}$ molecules/$cm^3$.

Sample A-3 was sealed under high pressure hydrogen gas at substantially 30 atm, and the furnace temperature was elevated up to 400° C. The inner gas pressure was found to be increased to approximately 100 atm. The sample was held in this state for 120 hours, followed by gradual cooling. The hydrogen concentration of the processed sample was measured and found to be $5.1 \times 10^{19}$ molecules/$cm^3$.

Sample A-4 was sealed under high pressure hydrogen gas at substantially 30 atm, and the furnace temperature was elevated up to 400° C. The inner gas pressure was found to be increased to approximately 100 atm. The sample was then held in this state for 48 hours, followed by gradual cooling. The hydrogen concentration of the processed sample was measured by the Raman scattering spectroscopic method and found to be $5.0 \times 10^{19}$ molecules/$cm^3$.

Sample A-5 was sealed under high pressure hydrogen gas at substantially 25 atm, and the furnace temperature was elevated up to 800° C. The inner gas pressure was found to be increased to approximately 100 atm. The sample was then held in this state for 24 hours, followed by gradual cooling. The hydrogen concentration of the processed sample was measured and found to be $5.2 \times 10^{19}$ molecules/$cm^3$.

Sample A-6 was processed by elevating the furnace temperature up to 300° C. while allowing hydrogen to flow under a pressure of 1 atm through the furnace. The sample was then held in this state for 720 hours, followed by gradual cooling. The hydrogen concentration of the processed sample was measured by the Raman scattering spectoscopic process and found to be $1\times10^{17}$ molecules/cm$^3$.

Sample A-7 was sealed under hydrogen gas at substantially 5 atm, and the furnace temerature was elevated up to 300° C. The inner gas pressure was found to be increased to approximately 10 atm. The sample was then held in this state for 720 hours, followed by gradual cooling. The hydrogen concentration of the processed sample was measured by the Raman scattering spectroscopic method and fond to be $1.2\times10^{18}$ molecules/cm$^3$.

Sample A-8 was sealed under high pressure hydrogen gas at subtantially 25 atm, and the furnace temperature was elevated up to 300° C. The inner gas pressure was found to be approximately 50 atm. The sample was then held in this state for 720 hours, followed by gradual cooling. The hydrogen concentration of the processed sample was measured by the Raman scattering spectoscopic method and found to be $3.2\times10^{19}$ molecules/cm$^3$.

Sample B-1 is a control which is subjected to neither a reduction defect removal process nor a hydrogen doping process. In this case, the sample was heated intensely with an oxyhydrogen burner for fused region formation. The hydrogen concentration was found to be $1\times10^{18}$ molecules/cm$^3$.

Sample B-2, like sample A-2, was sealed under high pressure hydrogen gas at substantially 50 atm, followed by temperature elevation up to 300° C. The inner gas pressure was found to be increased to approximately 100 atm. The sample was then held in this state for 720 hours. The hydrogen concentration of the processed sample was measured by the Raman scattering spectoscopic method and found to be $5.4\times10^{19}$ molecules/cm$^3$.

The laser resistance characteristics of the above samples were evaluated. This was done by irradiating each sample with an ArF excimer laser beam and measuring absorbance at 215 nm, the absorption peak of a paramagnetic defect (i.e. E* center). The absorbance at 215 nm, was calculated by –log (internal light permeability per 1 cm).

The method of the light permeability measurement will now be described.

Figure 6:
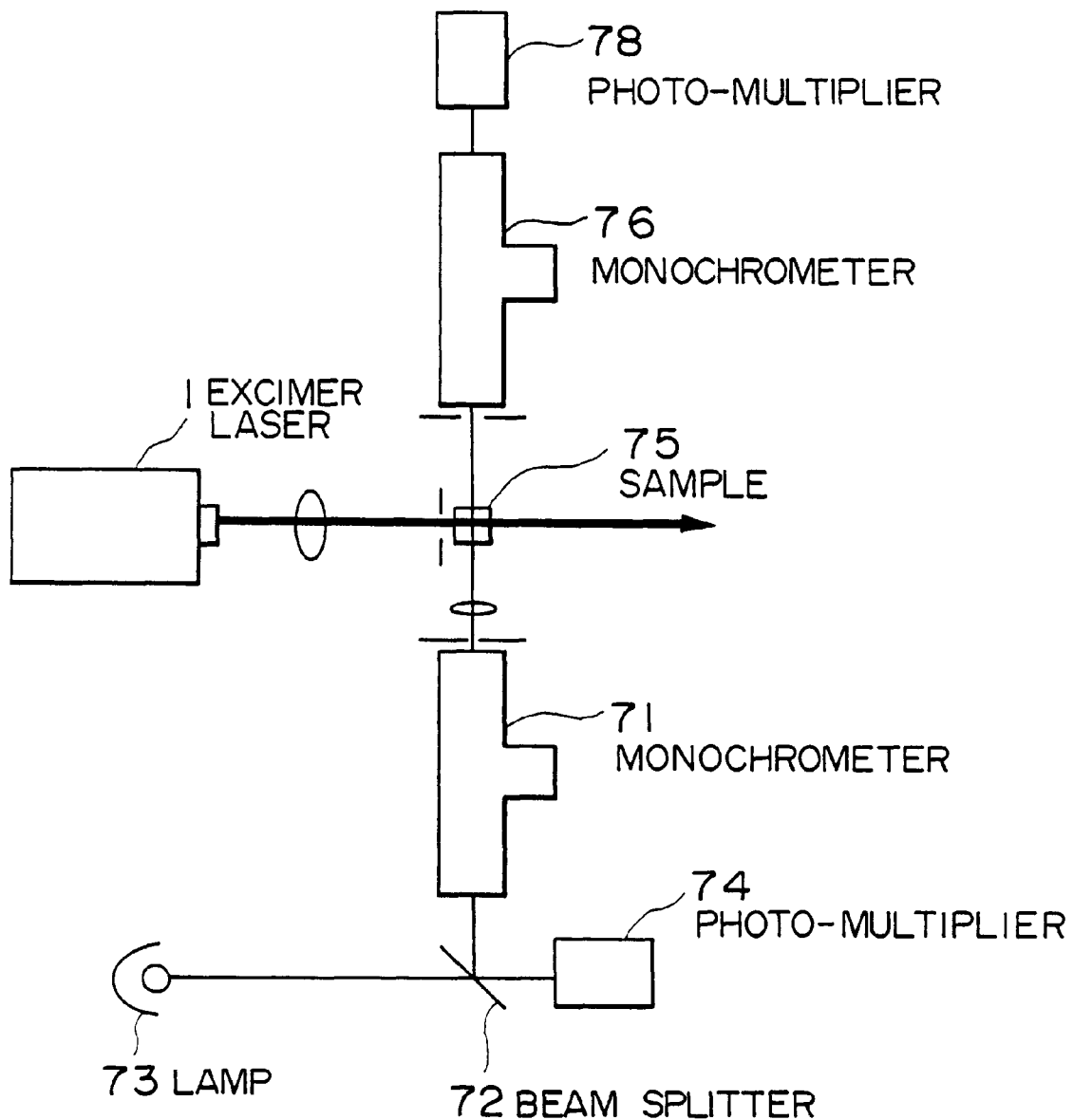
FIG. 6 is a schematic view showing a light permeability measuring apparatus useful to evaluate the internal light permeability of glass samples.

The measurement was made by using a light permeability measuring apparatus shown schematically in FIG. 6. Marked with 1 is an excimer laser generating apparatus manufactured by Lambda Physics Co., Ltd. as "LPX2000". The Laser is irradiated onto the surface of each sample at right angles to the surface with an energy density per pulse of 200 mJ/cm$^2$p and at 100 Hz.

The light permeability measuring apparatus comprises a "D2 lamp" 73 as a source of ultraviolet rays, a first monochromer 71 which spectroscopically extracts 215 nm light, a first photomultiplier 74 for measuring incident light through beam splitter 72, a second monochrometer arranged after a sample 75, and a second photomultiplier 78 for measuring the light passing through the sample.

Part of the light beam irradiated from the "D2 Lamp" enters the photomultiplier 74 through the beam splitter 72. The remainder of the light is passed through the monochromer 71, which spectroscopically extracts a 215 nm light beam, and is recieved by the photomultiplier 78 after passing through the sample 75 and monochromer 76. The light permeability can be measured from the ratio of the light recieved by the photomultiliers 74 and 78. Since the measurement of the light recieved by the photomultipliers 74 and 78 is synchronized with the oscillation pulses of the ecximer laser, the light permeability can be measured simultaneously with the laser beam irradiation.

Using the above apparatus, the internal light permeability of each sample was measured for every irradiation pulse from the side surface relative to the laser beam irradiation direction. The measured internal light permeabilities are shown in FIG. 1 to FIG. 3.

In the measurement of the light permeability, the wavelength was set at 215 nm, i.e. the absorption peak of the E* center. This was done because if the wavelength were the same as that of the laser, i.e. 193 nm, the apparatus might be destroyed by high energy light. Actually, however, there is a proportional relation between the light absorbance at 215 nm and that at 193 nm. Thus, it is possible to determine the internal light permeability of quartz glass by the above method while irradiating with a laser beam.

FIG. 2 shows the internal light permeability of the samples A-2 to A-5, which varies in accordance with the process temperature in the hydrogen-doping furnace. As the figure indicates, the internal light permeability of the samples A-2 and A-3, which were doped at the temperatures of 300° C. and 400° C., was 0.98 or above (⊚) in an initial characteristic (beam pulse number: $2\times10^4$ to $6\times10^4$) and also in an intermediate term characteristic (beam pulse number: $1\times10^5$). Further, as shown in FIG. 1, it was 0.96 to 0.98 (○) in a long term characteristic (beam pulse number: $1\times10^7$). Thus, these samples gave satisfactory evaluation results with regard to the laser beam resistance.

The internal light permeability is represented by (⊚) when it is 0.98 or above, (○) when it is 0.96 to 0.98, (Δ) when it is 0.94 to 0.96, and (×) when it is 0.94 or below.

With a doping temperature of 800 (sample A-5), the internal light permeability was decreased to 0.94 to 0.96 (Δ) in the initial characteristic and then as shown in FIG. 1 it remained at 0.94 to 0.96 (Δ) even in the long term characteristic.

With the sample which was not doped with hydrogen but was only treated to remove reduction defects (sample A-1), the internal light permeability was in the range from 0.94 to 0.96 (Δ), but it gradually decreased to 0.94 or below (×) in the long term characteristic as shown in FIG. 1. At any rate, it was impossible to obtain a desirable laser beam resistance evaluation.

With a doping temperature of 600° C. (sample A-4), the internal light permeability was decreased to 0.96 to 0.98 (○) in the initial characteristic and, as shown in FIG. 1, it remained at the same level as 0.96 to 0.98 (○) in the long term characteristic.

With the samples B-1 and B-2 which were not treated to remove reduction defects, it will be seen that the internal light permeability was decreased greatly in the initial characteristic (beam pulse number: $2\times10^4$) but subsequently recovered quickly. It was confirmed that the extent of recovery corresponded to the hydrogen concentration, and thus the sample B-2 ($5.4\times10^{19}$ molecules/cm$^3$) was superior to the sample B-1 ($1\times10^{18}$ molecules/cm$^3$).

It was confirmed from FIG. 1 that the internal light permeability of sample B-2 at 215 nm after irradiation with $10^7$ pulses was recovered substantially to the same extent as the sample A-8.

FIG. 3 shows the hydrogen concentration and internal light permeability (i.e., difference T % of the internal light permeability at 215 nm before and after irradiation with $10^7$ pulses of an ArF laser beam (200 mJ/cm$^2$p), 100 Hz)), which vary with the pressure in the hydrogen doping process. As is seen, with a doping pressure of 100 atm and above (samples A-2 and A-9) it was possible to obtain satisfactory internal light permeability. With the sample A-8 in which the doping pressure was 50 atm, the internal light permeability was decreased, but only to an extent that the decreased value actually posed no problem. With doping pressures of 10 atm or below (samples A-6 and A-7), the internal light permeability was decreased greatly. Particularly, with the sample A-6 the inernal light permeability was decreased to 0.94 or below (x), and with the sample A-7 it was also decreased to 0.94 or below (x).

Meanwhile, in an excimer laser abrasion processing machine, the laser output needs to be as high as 100 to 700 $mJ/cm^2p$. An optical member which can provide sufficient durability when used in such an excimer laser abrasion processing machine, can be obtained by subjecting the process material to a reduction defect removal process (i.e. adjusting the hydrogen concentration to $1 \times 10^{16}$ molecules/$cm^3$) as noted above by heating the material in an oxygen-containing atmosphere and in a temperature range of preferably 800° C. to 1,300° C., and then doping the resultant material with hydrogen under a high pressure of 50 atm or above, preferably 100 atm or above, and at a temperature of 600° C. or below, preferably about 300 to 450° C., thereby adjusting the hydrogen concentration to $1 \times 10^{19}$ molecules/$cm^3$ or more. On the other hand, an optical member used in a lithographic apparatus is not always required to have high output laser beam resistance as noted above, because in this case the laser output that is required is only about 1 to 10 $mJ/cm^2p$.

In the evaluation tests described above, the samples A-4 to A-7 and B-2 were deemed to be unsatisfactory. For these samples, it was observed how the internal light permeability depended on the pressure and temperature of the hydrogen doping process and also on whether the reduction defects removal process prior to the hydrogen doping process affected the internal light permeability. Specifically, the internal light permeability at 215 nm after irradiation of each sample with 1/10 of the laser output used in the previous test, that is with $10^7$ pulses of an ArF laser beam(20 $mJ/cm^2p$, 100 Hz), was observed. As shown in FIG. 1, even at a doping temperature of 600° C. (sample A-4) it was possible to obtain satisfactory internal light permeability (◎→◎). At a doping temperature of 800° C. (sample A-5), however, it was impossible to obtain a satisfactory laser beam resistance evaluation although the internal light permeability was slightly recovered from the initial characteristic stage (Δ→○).

In a doping temperature range of 300 to 600° C., with a doping pressure of 10 Pa or above (sample A-7) it was possible to obtain satisfactory internal light permeability (◎→○). With a doping pressure of 1 Pa (sample A-6), the internal light permeability was decreased from the initial chacteristic (◎) to the long term characteristic (Δ), but the decrease was in such a range as to be usable.

As to whether not carrying out the reduction defects removal process prior to the hydrogen doping process, with the sample B-2, in which the sole hydrogen doping process was carried out without undertaking a reduction defects removal process, although the hydrogen concentration was $5 \times 10^{19}$ molecules/$cm^3$, the internal light permeability was greatly decreased in the initial characteristic stage (x), and it was impossible to obtain a satisfactory laser beam resistance evaluation suitable for a highly accurate lithographic system.

As described previously, it is an important element from the standpoint of image resolution that the optical material should have not only satisfactory light permeability and retention thereof (commonly called durability) at the working wavelength, but also its refractive index with respect to the transmitted light must be uniform (or equal) in any part of the optical path. The optical material meets the requirements for use in an optical part only by having complete set of the above three elements.

The description so far has been made to clarify the necessity of the first and second steps (i.e., light permeability and durability). Now, the importance of the third step of carrying out a treatment which makes the hydrogen concentration distribution uniform in the optical material, in which the hydrogen concentration has been increased by doping at low temperature and at high hydrogen concentration (that is high pressure), will be described in connection with further examples.

Figure 10:
FIG. 10 is a schematic representation showing refractive index uniformity at the end of the first step when the first through third steps in an embodiment of the invention were carried out in succession.

Fine silica particles were generated by subjecting a volatile silicon compound to flame hydrolysis, and directly melted and deposited on a rotating core rod to obtain synthetic quartz glass. The resulting synthetic quartz glass then was subjected to a treatment making it homogeneous by a zone melting method. Then a plurality of quartz glass moldings having an outer diameter of 100 mm and a thickness of 50 mm, were obtained from the synthetic quartz glass by thermal molding using graphite dies at 1,800° C. in a furnace with a nitrogen atomosphere. The moldings were then heated to 1,150° C. for 10 hours and then gradually cooled down, thus obtaining highly homogeneous quartz glass material free from striae in the working direction and having a refractive index uniformity Δn of $1 \times 10^{-6}$. The moldings thus obtained are referred to as sample group C. FIG. 10 shows one state of the sample group C with uniform refractive index.

Then, the sample group C was heated in the ambient atmosphere at 1,150° C. for 50 hours, and then gradually cooled down at a cooling rate of 5° C. per hour. The hydrogen concentration of the resultant material was $5 \times 10^{16}$ molecules/$cm^3$ or below (first step).

Figure 11:
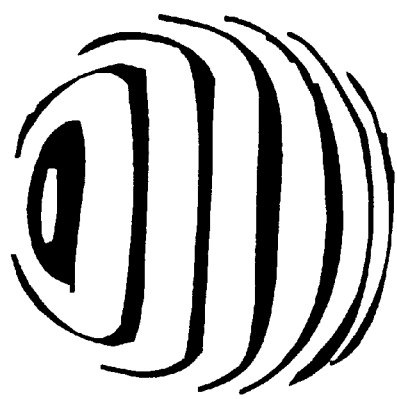
FIG. 11 is a schematic representation showing refractive index uniformity at the end of the second step when the first through third steps in the embodiment of the invention were carried out in succession.

The sample group C obtained in the first step was heated in a pressurized hydrogen furnace under 100 atmospheres pressure at 500° C. for 500 hours. The hydrogen concentration of the quartz glass material thus obtained was measured. The measured hydrogen concentration was $7 \times 10^{18}$ molecules/$cm^3$ in the central portion and $2.5 \times 10^{19}$ molecules/$cm^3$ in a portion spaced 20 mm from the outer periphery. The concentration difference was thus 3.5 times. Accordingly the refractive index was very high in the periphery and Δn was $2 \times 10^{-5}$, a level at which the material cannot be used as optical component. This state is shown in FIG. 11 (second step). For effective use as an optical component, it is desirable to have a refractive index uniformity Δn of $1 \times 10^{-5}$ or less, preferably $5 \times 10^{-6}$ or less.

Figure 12:
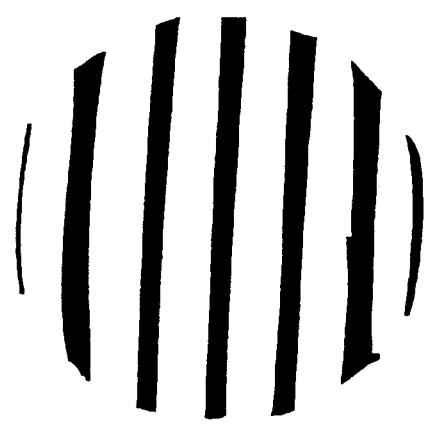
FIG. 12 is a schematic representation showing refractive index uniformity at the end of the third step when the first through third steps in the embodiment of the invention were carried out in succession.

The sample group C having been subjected to the first and second steps, was then heated in the atmosphere at 500° C. for 50 to 400 hours. FIG. 8 shows the measured hydrogen concentration distributions of samples C-1 to C-5 obtained with respective thermal treatment times. As is seen, with a treatment time of 50 hours in the case of sample C-1, the Δn improvement is insufficient due to incomplete treatment. With the samples for which treatment times are in excess of 300 hours, no further improvement of the refractive index distribution are recognized. Besides, a reduction of the hydrogen concentration is recognized. FIG. 12 shows the interference fringes pattern of the sample after the third treatment step. As can be seen from the figure, the sample is in a state of uniform hydrogen concentration distribution.

Thermal treatment was also conducted in the ambient atmosphere at 600° C. for treatment times of 30, 60, 120, 180 and 240 hours. The results are shown in FIG. 9.

Thus, appropriate empirical conditions for homogenizing hydrogen concentration distribution are related to dependence of the hydrogen diffusibility in quartz glass on temperature. Applicants have found that there is an appropriate treatment time range in the third step according to the temperature difference between the second step and the third step. To define quantitatively by diffusion theory, it was found suitable and necessary that the third step of making the hydrogen concentration uniform be carried out at a temperature in a temperature range between 500 and 800° C. and which also is higher than the temperature range in the second step, for a process time in a range between $(0.6)^{\Delta T/100} \times 20\%$ and $(0.6)^{\Delta T/100} \times 40\%$ ($\Delta T$ being the difference between the process temperatures of the second and third steps) of the process time of the second step.

Figure 7:
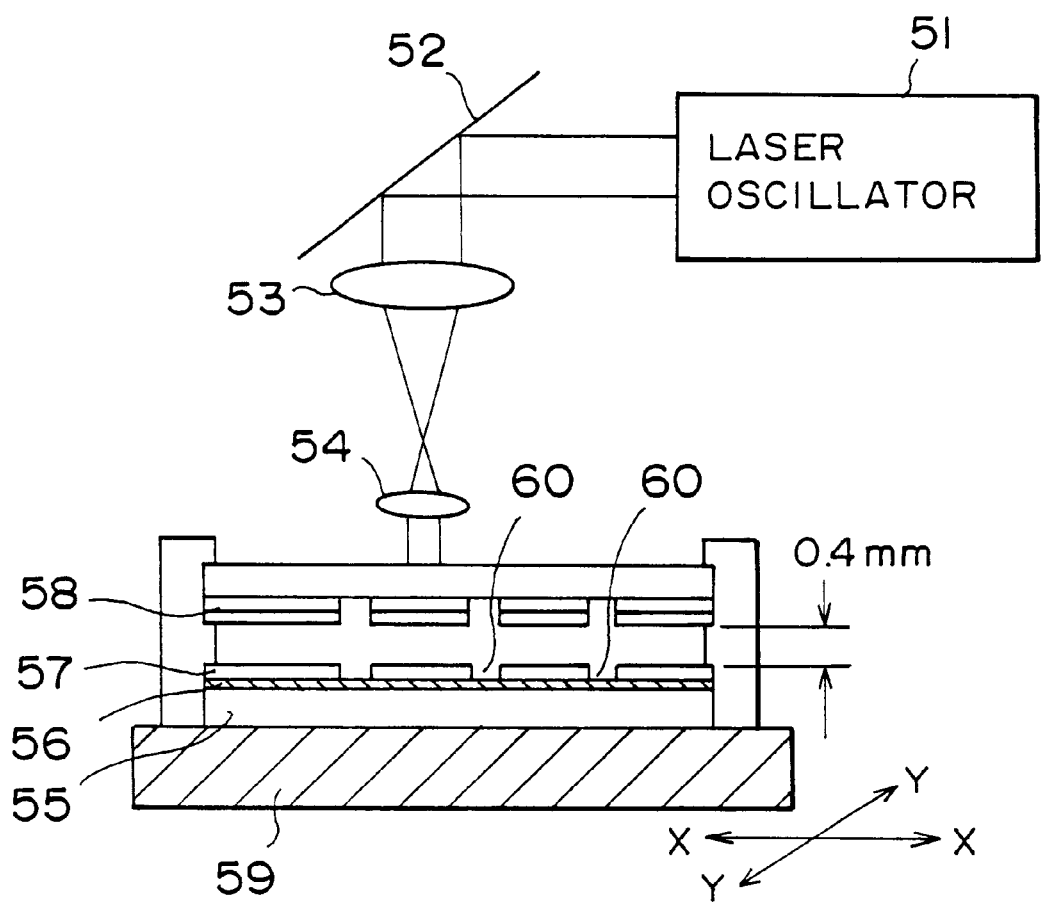
FIG. 7 is a schematic view showing an excimer laser abrasion processing machine, in which the optical member according to the invention is assembled.

An example of an excimer laser abrasion processing machine, in which the optical member according to the invention may be used, is shown in FIG. 7.

This machine is for forming inter-lead layer holes (i.e., VIA hole processing) on an inter-layer insulating film of a multiple-layer wiring board. Referring to the Figure, designated at 51 is a laser oscillator, at 52 a mirror, at 53 a converging lens, at 54 a collimating lens, and at 55 a quartz glass substrate. On the quartz glass substrate 55, a copper (Cu) film 56 is formed having a thickness of 2 µm. On the Cu film 56 a resin film 57, i.e. a polyimide film, is formed having a thickness of 40 µm.

On this wafer, a mask 58 is formed at an interval of 0.4 mm. The resultant wafer is secured to the top of an X-Y stage 59.

The mask 58 includes a synthetic quartz substrate 58A and a dielectric multiple-layer film 58B having the hole pattern of diameter 40 µm formed thereon.

In such machine, the mirror 52, converging lens 53 and collimating lens 54 were fabricated with the sample C-2 or C-4 optical material as described above. Using this machine, the quartz glass substrate 55 was scanning processed in a step-and-repeat process by moving the X-Y stage 59 according to the hole pattern of the mask 56 while causing oscillation of the excimer laser from the oscillator 51 at an oscillation wavelength of 248 nm (KrF), with an output of 300 mJ/cm²p and at a frequency of 200 Hz and also causing the deflection, convergence and collimation of the laser beam via the mirror 52 and lenses 53 and 54. This scanning process was carried out repeatedly for a number of quartz glass substrates. It was confirmed that it was possible to form highly accurate through holes 60 in the resin film 57 without causing damage to the base Cu film 56.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for manufacturing an excimer laser ultraviolet-radiation-resistant optical member from a synthetic quartz glass starting material obtained by flame hydrolysis of volatile silicon compounds to generate fine silica particles and direct fusion deposition of the silica particles on a rotating core rod, said process comprising:

a first step of subjecting the quartz glass starting material to an oxidizing heat treatment in a temperature range between 600 and 1,500° C. to decrease a hydrogen concentration of the quartz glass to $5 \times 10^{16}$ molecules/cm³ or less;

a second step of holding the quartz glass obtained in the first step in a hydrogen-containing atmosphere at a pressure of at least 10 atmospheres in a temperature range between 200 and 600° C. for a process time sufficient to establish a hydrogen concentration in the quartz glass of at least $1 \times 10^{17}$ molecules/cm³; and a third step of carrying out a treatment of making the hydrogen concentration distribution of the quartz glass obtained in the second step uniform by holding the quartz glass in an atmosphere of air, inert gas, hydrogen, a mixture of hydrogen and inert gas, or a mixture of air and inert gas in a particular temperature range for a time sufficient to establish a uniform hydrogen concentration distribution evidenced by a refractive index uniformity $\Delta n$ of $1 \times 10^{-5}$ or less;

wherein the third step is carried out at a temperature which lies between 500 and 800° C. and which is higher than the temperature in the second step, and for a process time in a range between $(0.6)^{\Delta T/100} \times 20\%$ and $(0.6)^{\Delta T/100} \times 40\%$ of the process time of the second step, where $\Delta T$ is the difference between the process temperatures of the second and third steps.

2. A process according to claim 1, wherein the oxidizing heat treatment in the first step is carried out in a temperature range from 1000 to 1300° C.

3. A process according to claim 1, wherein the hydrogen containing atmosphere in the second step has a pressure of at least 50 atmospheres.

4. A process according to claim 3, wherein the hydrogen containing atmosphere in the second step has a pressure of at least 100 atmospheres.

5. A process according to claim 1, wherein the glass in the second step is held in the hydrogen containing atmosphere in a temperature range between 300 and 450° C.

6. A process according to claim 1, wherein a hydrogen concentration in the glass of at least $1 \times 10^{19}$ molecules/cm³ is established in the second step.

7. A process according to claim 1, wherein the third step is carried out for a time sufficient to establish a refractive index uniformity $\Delta n$ of $5 \times 10^{-6}$ or less.

8. A process of manufacturing an excimer laser ultraviolet-radiation-resistant optical material from an optical quartz material having no striae in at least one direction and having a refractive index uniformity ($\Delta n$) of $5 \times 10^{-6}$ or less in said one direction, obtained as a result of carrying out a uniformizing treatment and a strain removal treatment on a synthetic quartz glass starting material obtained by flame hydrolysis of a volatile silicon compound to generate silica particles on a rotating core rod, said process comprising:

a first step of subjecting the quartz glass starting material to an oxidizing heat treatment in a temperature between 600 and 1,500° C. to decrease a hydrogen concentration of the glass to $5 \times 10^{16}$ molecules/cm³ or less;

a second step of holding the quartz glass obtained in the first step in a hydrogen-containing atmosphere at a pressure of at least 10 atmospheres in a temperature range between 200 and 600° C. for a process time sufficient to establish a hydrogen concentration in the quartz glass of at least $1 \times 10^{17}$ molecules/cm³; and a third step of carrying out a treatment of making the hydrogen concentration distribution of the quartz glass obtained in the second step uniform by holding the quartz glass in an atmosphere of air, inert gas, hydrogen, a mixture of hydrogen and inert gas, or a mixture of air and inert-gas in a particular temperature range for a time sufficient to establish a uniform hydrogen concentration distribution evidenced by a refractive index uniformity Δn of $1 \times 10^{-5}$ or less;

wherein the third step is carried out at a temperature which lies between 500 and 800° C. and which is higher than the temperature in the second step, and for a process time in a range between $(0.6)^{\Delta T/100} \times 20\%$ and $(0.6)^{\Delta T/100} \times 40\%$ of the process time of the second step, where ΔT is the difference between the process temperatures of the second and third steps.

9. A process according to claim 8, wherein the oxidizing heat treatment in the first step is carried out in a temperature range from 1000 to 1300° C.

10. A process according to claim 8, wherein the hydrogen containing atmosphere in the second step has a pressure of at least 50 atmospheres.

11. A process according to claim 10, wherein the hydrogen containing atmosphere in the second step has a pressure of at least 100 atmospheres.

12. A process according to claim 8, wherein the glass in the second step is held in the hydrogen containing atmosphere in a temperature range between 300 and 450° C.

13. A process according to claim 8, wherein a hydrogen concentration in the glass of at least $1 \times 10^{19}$ molecules/cm$^3$ is established in the second step.

14. A process according to claim 8, wherein the third step is carried out for a time sufficient to establish a refractive index uniformity Δn of $5 \times 10^{-6}$ or less.

15. A method of manufacturing an ultraviolet-radiation-resistant optical member from a synthetic quartz glass starting material obtained by flame hydrolysis of a volatile silicon compound to generate fine silica particles and direct fusion deposition of the silica particles on a rotating core rod so as to grow the rod while maintaining a uniform distribution of refractive index of the rod, said process comprising:

a first step of subjecting the quartz glass starting material to an oxidizing heat treatment in a temperature range between 600 and 1,500° C. to decrease a hydrogen concentration of the glass to $5 \times 10^{16}$ molecules/cm$^3$ or less;

a second step of holding the quartz glass obtained in the first step in a hydrogen-containing atmosphere at a pressure of at least 10 atmospheres in a temperature range between 200 and 600° C. for a process time sufficient to establish a hydrogen concentration in the quartz glass of at least $1 \times 10^{17}$ molecules/cm$^3$; and a third step of carrying out a treatment of making the hydrogen concentration distribution of the quartz glass obtained in the second step uniform by holding the quartz glass in an atmosphere of air, inert gas, hydrogen, a mixture of hydrogen and inert gas, or a mixture of air and inert gas in a particular temperature range for a time sufficient to establish a uniform hydrogen concentration distribution evidenced by a refractive index uniformity Δn of $1 \times 10^{-5}$ or less;

wherein the third step is carried out at a temperature which lies between 500 and 800° C. and which is higher than the temperature in the second step, and for a process time in a range between $(0.6)^{\Delta T/100} \times 20\%$ and $(0.6)^{\Delta T/100} \times 40\%$ of the process time of the second step, where ΔT is the difference between the process temperatures of the second and third steps.

16. A method according to claim 15, wherein the oxidizing heat treatment in the first step is carried out in a temperature range from 1000 to 1300° C.

17. A method according to claim 15, wherein the hydrogen containing atmosphere in the second step has a pressure of at least 50 atmospheres.

18. A method according to claim 17, wherein the hydrogen containing atmosphere in the second step has a pressure of at least 100 atmospheres.

19. A method according to claim 15, wherein the glass in the second step is held in the hydrogen containing atmosphere in a temperature range between 300 and 450° C.

20. A method according to claim 15, wherein a hydrogen concentration in the glass of at least $1 \times 10^{19}$ molecules/cm$^3$ is established in the second step.

21. A method according to claim 15, wherein the flame hydrolysis is carried out with a single burner.

22. A method according to claim 15, wherein the flame hydrolysis is carried out with a plurality of burners.

23. A method according to claim 15, wherein a uniform refractive index is maintained in the core rod during growth thereof by controlling the growth conditions.

24. A method according to claim 23, wherein the temperature during growth of the core rod is controlled to maintain a uniform refractive index therein.

25. A method according to claim 15, wherein the third step is carried out for a time sufficient to establish a refractive index uniformity Δn of $5 \times 10^{-6}$ or less.

* * * * *